US008704136B2

(12) United States Patent
Posch et al.

(10) Patent No.: US 8,704,136 B2
(45) Date of Patent: Apr. 22, 2014

(54) FILLER FOR JOINT AND METHOD FOR PRODUCTION THEREOF

(75) Inventors: Gerhard Posch, St. Peter/Freienstein (AT); Johann Ziegerhofer, Mitterdorf (AT); Susanne Baumgartner, Graz (AT); Wilhelm Klagges, Kindberg (AT); Herbert Felberbauer, Oberaich (AT)

(73) Assignee: Boehler Schweisstechnik Austria GmbH, Kapfenberg (AT)

( * ) Notice: Subject to any disclaimer, the term of this patent is extended or adjusted under 35 U.S.C. 154(b) by 1804 days.

(21) Appl. No.: 11/569,549

(22) PCT Filed: May 25, 2005

(86) PCT No.: PCT/AT2005/000182

§ 371 (c)(1), (2), (4) Date: Mar. 13, 2007

(87) PCT Pub. No.: WO2005/115680

PCT Pub. Date: Dec. 8, 2005

(65) Prior Publication Data

US 2008/0014458 A1 Jan. 17, 2008

(30) Foreign Application Priority Data

May 27, 2004 (AT) .................................. A 927/2004

(51) Int. Cl.
*B23K 35/24* (2006.01)

(52) U.S. Cl.
USPC .............. 219/146.31; 219/146.1; 219/146.32; 219/137 WM; 428/385

(58) Field of Classification Search
USPC ............. 219/146.31, 145.22, 145.23, 146.22, 219/146.1, 146.32, 145.1, 137 WM; 428/385, 576; 148/23; 228/101, 122.1
See application file for complete search history.

(56) References Cited

U.S. PATENT DOCUMENTS 1,871,257 A * 8/1932 Cadwell ........................ 428/368
1,951,750 A * 3/1934 Cole ........................ 219/146.51

(Continued)

FOREIGN PATENT DOCUMENTS

AT 500 494 B1 12/2006
DE 1558900 8/1970

(Continued)

OTHER PUBLICATIONS

English Language Abstract of JP 6-304780,•published Nov. 1, 1994.

(Continued)

*Primary Examiner* — Dana Ross
*Assistant Examiner* — John Wasaff
(74) *Attorney, Agent, or Firm* — Greenblum & Bernstein, P.L.C.

(57) ABSTRACT

The invention relates to a filler material for a thermal production of a joint or of a material layer metallically connected to the base material of or on objects of light metal and/or zinc alloys with a thermal conductivity of more than 110 W/mK, and to a method for producing the same with means for the preparation thereof in situ and/or storage. To improve the quality of the connection, it is provided according to the invention that the filler material is formed as unwindable filler wire, built up of a sheath optionally provided with a surface layer formed from polymer(s) and graphite and comprising aluminum and/or magnesium and/or zinc or a deformable alloy of these metals with a thermal conductivity of more than 110 W/mK and a core of compacted powder, whereby the core material comprises a metal powder and/or a powder of at least one metal compound and/or a non-metallic compound and/or an agent giving off gas at increased temperature and/or at least one component forming slag. The production is characterized by a filler wire production known per se, but with an optionally coated sheath of a ductile light metal or the like alloy, with a correctly positioned winding on coils and providing the same with a protection against moisture.

44 Claims, 11 Drawing Sheets

(56) References Cited

U.S. PATENT DOCUMENTS

| | | | | | |
|---|---|---|---|---|---|
| 2,003,020 | A | * | 5/1935 | Strobel | 219/146.51 |
| 2,785,285 | A | * | 3/1957 | Bernard | 219/146.22 |
| 3,004,872 | A | * | 10/1961 | Stark | 428/385 |
| 3,114,612 | A | * | 12/1963 | Friedrich | 428/594 |
| 3,318,729 | A | | 5/1967 | Siegle et al. | |
| 3,555,240 | A | * | 1/1971 | Gloor et al. | 219/145.23 |
| 3,614,380 | A | * | 10/1971 | Bray | 219/146.22 |
| 3,620,830 | A | * | 11/1971 | Kramer | 219/145.23 |
| 3,627,979 | A | * | 12/1971 | Quaas | 219/146.51 |
| 3,636,301 | A | * | 1/1972 | Ischenko et al. | 219/137 R |
| 3,787,658 | A | * | 1/1974 | Kammer et al. | 219/146.41 |
| 3,805,016 | A | * | 4/1974 | Soejima et al. | 219/146.52 |
| 3,851,143 | A | * | 11/1974 | Bishel | 219/146.52 |
| 4,109,059 | A | * | 8/1978 | De Haeck | 428/558 |
| 4,119,262 | A | * | 10/1978 | Yen et al. | 228/206 |
| 4,147,837 | A | * | 4/1979 | Nieman | 428/548 |
| 4,196,333 | A | * | 4/1980 | Emmerson | 219/60 A |
| 4,510,374 | A | * | 4/1985 | Kobayashi et al. | 219/146.1 |
| 4,562,331 | A | * | 12/1985 | Motoo | 219/121.14 |
| 4,587,726 | A | * | 5/1986 | Holmgren | 29/825 |
| 4,689,461 | A | * | 8/1987 | Gamberg | 219/69.1 |
| 4,913,927 | A | * | 4/1990 | Anderson | 427/580 |
| 5,003,155 | A | * | 3/1991 | Chai et al. | 219/145.22 |
| 5,111,002 | A | * | 5/1992 | Hollander | 174/102 P |
| 5,233,160 | A | * | 8/1993 | Gordish et al. | 219/137 WM |
| 5,260,540 | A | * | 11/1993 | Kamimura et al. | 219/76.14 |
| 5,365,036 | A | * | 11/1994 | Crockett et al. | 219/137 WM |
| 5,369,244 | A | * | 11/1994 | Kulikowski et al. | 219/145.22 |
| 5,857,141 | A | * | 1/1999 | Keegan et al. | 428/560 |
| 2002/0037420 | A1 | * | 3/2002 | Shimizu et al. | 428/471 |
| 2003/0098296 | A1 | | 5/2003 | Keegan et al. | |
| 2003/0116234 | A1 | | 6/2003 | Santella et al. | |

FOREIGN PATENT DOCUMENTS

| | | | | |
|---|---|---|---|---|
| EP | 1197288 | | 4/2002 | |
| GB | 949752 | | 2/1964 | |
| JP | 6-304780 | | 11/1994 | |
| WO | WO 0134860 | A1 * | 5/2001 | C22C 11/00 |

OTHER PUBLICATIONS

English translation of the International Preliminary Report on Patentability for International application No. PCT/AT2005/000182 dated Mar. 19, 2007.

* cited by examiner 1
2
14
2 mm

FILLER FOR JOINT AND METHOD FOR PRODUCTION THEREOF

BACKGROUND OF THE INVENTION

1. Field of the Invention

The invention relates to a filler material for a thermal production of a joint or of a material layer metallically connected to the base material of or on objects of light metal and/or zinc alloys with a thermal conductivity of more than 110 W/mK.

Furthermore, the invention includes a method for producing a filler material for a connection or an application of or on objects of light metal and/or zinc or an alloy of these metals with a thermal conductivity of more than 110 W/mK with means for the preparation thereof in situ and/or storage.

Finally, the invention relates to the use of a filler material formed as filler wire for a thermal production of a joint.

2. Background Information

According to DIN 8593, joining is a permanent connection of workpieces, whereby the invention relates to joining by welding or by soldering. Joining by welding according to DIN 1910 of the present invention relates to fusion welding with welding filler and soldering according to DIN 8505 relates to joining by brazing.

Joining parts or objects or applying a material thereto by fusion welding or soldering with filler material has been prior art for a long time and is widely used in production engineering.

In welding the bond is achieved by uniting materials, whereby the parting line between two workpieces is made by fusing together their materials with a welding filler and can be promoted with auxiliaries such as gases, welding flux or paste.

In soldering the parting line between two workpieces is completely filled with liquid metal and a connection by adhesive force is thus produced, whereby soldering auxiliaries or solders are generally used.

When joining parts with a desired high quality of the joint by welding or soldering, the materials or their properties are very important. In other words: not all materials or metals have welding or soldering properties of sufficient quality.

The quality of a welded joint can be affected in a highly detrimental manner by a high thermal conductivity and/or a high oxygen activity of the material and/or a surface tension of the liquid metal and/or the vapor pressure of a phase or the like.

One skilled in the art is aware that it often seems impossible to achieve a connection of base material and weld material up to the edge of the same in the welding together or deposit welding of or on parts of aluminum and aluminum alloys with bar electrodes or solid wire electrodes, and an area without metallic bonding results in the outer zones of the weld material layer.

If the welding energy is now increased in order to reduce this bonding flaw, the porosity in the weld material increases or enlarges, which can lead to a mechanical weakening of the same.

In soldering, sufficient penetration of solder into the gap between the parts or a connection of the same to the solder often do not occur, despite soldering aids. The occurrence of these flaws is often attributed to the high thermal conductivity of the materials and/or the weld behavior and oxidation behavior of the solder and/or the soldering surface passivation.

To overcome bonding flaws it is also known to use a pulsed energy supply for welding or soldering; however, only an energy supply can usually be regulated thereby, but the energy distribution at the weld point or soldering point cannot be embodied advantageously such that the weld material exhibits a metallic connection with the base material up to the outermost edge thereof or that the solder is distributed homogenously in the parting line.

SUMMARY OF THE INVENTION

The invention is intended here to eliminate the defects in the prior art with a thermal production of a joint or of a material layer connected to the base material of or on objects of light metal alloys and/or zinc alloys with a thermal conductivity of more than 110 W/mK and the object is to create a filler material that has improved suitability for welding and soldering the above materials.

Furthermore, the object of the invention is to provide a method for the production while maintaining quality of a filler material for a joining of the type mentioned at the outset with which a quality of the material connection can be increased.

Furthermore, the object of the invention is to disclose a particular use of a new improved filler material.

The object of the invention is attained in that the filler material is formed as an unwindable filler wire, built up of a sheath of aluminum and/or of magnesium and/or zinc or a deformable alloy of these metals with a thermal conductivity of more than 110 W/mK and a core of compacted powder, whereby the core material comprises a metal powder and/or a powder of at least one metal compound and/or a non-metallic compound and/or an agent giving off gas at increased temperature and/or at least one component forming slag.

The advantages obtained with the invention lie essentially in the composition of the filler material and in the coordination of the same with the base material or with the material properties.

It was found that with a filler wire with a sheath of light metal alloys or zinc alloys with a conductivity of 0.027 to 0.2 μΩxm, an unexpectedly strong current concentration is given on the surface of the electrode, so that in the area of the energy supply an introduction of heat into the base material occurs that is largely the same over the cross section or that is increased in the outer zone. It was found that, even with a high metal content of the core material, the core of the filler wire composed of powder conducts the electric current in the energy supply to a much lower extent. Thus with a filler wire according to the invention a specific energy supply distributed in the heat area of the base material can be achieved and thus an improved adhesive connection with welding up to the edge of the weld material.

A distribution of the energy or heat supply is essentially dependent on the continuous metallic sheath of the filler wire and can be adjusted therewith.

It has proven to be advantageous, in particular with regard to a desired quantity of weld material, if the sheath of the filler material has a proportion of 95% to 40% of the electrode volume.

For an optimization of an areal energy supply into the hot zone, it can be favorable if the proportion of the sheath of the cross-sectional area of the filler wire is 95% to 40%.

If, as can be further provided, the filler wire has a fullness with core material in parts by weight of 5% to 52%, this can be advantageous in particular for a use in connecting light metals.

Intensive tests with aluminum and magnesium and alloys with these metals have shown that a filler wire according to the invention greatly reduces the porosity of the weld material and/or reduces the pore size, above all when the core material comprises polymers, preferably organic polymers, in particular polytetrafluoroethylene (PTFE).

If, as according to a special embodiment of the invention, the core material of the filler wire comprises alkali metal compounds, e.g., sodium and/or potassium compounds, in particular fluorides and/or chlorides of alkali metals, a fluxing medium or covering medium, such as slag, can be produced, which is advantageously effective for a metal compound, even if the individual compounds are not present in a premelted state.

In a particularly advantageous further development of the invention, it can be provided for the filler material to contain graphite. Through graphite or carbon it is possible to further lower the oxidation potential of the protective gas formed and to promote a stability of the electric arc.

If, as can be provided according to the invention, the outer surface of the filler wire has a layer formed of polymers, preferably organic polymers, in particular polytetrafluoroethylene (PTFE) and graphite, furthermore a protective gas blanket of the liquid metal can be improved and a current transfer to the filler wire can be considerably improved.

The favorable effect of an addition of graphite can be optimized if the volume fraction of graphite in the layer is 15% to 45%.

The quality of a joint between parts of aluminum and of aluminum alloys can be optimized if the filler wire used therefor has a core material with a proportion of 8% by weight to 24% by weight formed from metal powder and fluoride(s) and the sheath has a surface layer of polymer(s) and graphite.

The filler wire has proven to be particularly well suited as welding filler for a production of a fusion-welded connection for the above-mentioned materials because on the one hand protective and/or reaction gases can be advantageously formed through the core material in the electric arc, on the other hand a desired alloy composition of the weld material can be formed by melt-metallurgy through an addition of metal powder.

If the filler wire is used as solder filler or solder to produce a soldered connection, this means has the advantage of a central injection of soldering agent substances directly into the parting line and can thus essentially promote the formation of an adhesive connection of the parts.

With respect to a high quality of the soldered connection, it can be favorable if the sheath material of the filler wire has a lower solidus temperature than the base material(s).

The further object of the invention is attained with a method of the type mentioned at the outset in that a metal strip of aluminum and/or magnesium and/or zinc or a ductile alloy respectively of these metals is bent in a manner known per se in the longitudinal direction into a flute, acted on with filler, formed into a tube and this is brought to a diameter of more than 0.5 mm, but less than 3.5 mm, whereupon the filler wire thus formed is wound on a coil form correctly positioned and the wound coil(s) are stored provided with a protection against moisture and/or prepared in situ.

The advantages of the method according to the invention can be seen essentially in that the filler wire is produced from a sheath material with a non-ferrous base alloy with low strength, whereby a desired core density is achieved and an output form favorable for a supply to the welding or soldering device into the base bodies up to the thermal energy supply area is produced and essentially no changes to the often hygroscopic filler wire components that influence the use parameters or the quality of the joint occur during an optional long-term storage.

With particular advantage for a production and the technology of the connection thereby used, it can be provided for the tube provided with filler to be brought to a diameter of less than 2.0 mm. In order to achieve a specific and/or targeted gas release and/or to set a specific solution behavior of the core powder compositions, it can be favorable if the filler or components of the same is (are) at least partially pretreated and/or mixed homogenously as a powder before insertion in the metal flute.

In a particularly advantageous embodiment of the invention it is provided that polymers, preferably organic polymers, in particular polytetrafluoroethylene, is (are) added to the filler as a component and/or applied to the outside of the filler wire. In this manner, as one skilled in the art surprisingly discovered, a pore formation, in particular one with a large volume, can be substantially reduced in the weld material.

It has been shown to have a favorable effect in a production of a joint if sodium and/or potassium and/or magnesium and/or calcium compound(s) is (are) added to the filler as component(s) to form slag. The flow properties of the filler material and an adhesive connection of the parts of base material can thus be promoted.

In particular for alloying the material of the filler metal forming with respect to changed and desired mechanical properties of the same, it can be provided that powder of metal and/or metal compounds and/or non-metallic compounds is added to the filler as component(s).

In order to preserve the properties of the components of the filler material unchanged or only with insignificant changes in the entire production process, it has proven to be favorable if the filler wire is produced under conditions with reduced oxygen content and/or reduced moisture content compared to the atmosphere.

For an advantageous embodiment of the invention in which the filler wire is wound on a coil form with a mass of 2 to 10 kg and one or more coil(s) are packed in foil or in containers in an airtight manner, optionally in a vacuum, the quality of the filler material for a joint and the high quality of the adhesive connection itself can be retained, even with longer storage and larger inventory.

If the filler wire is conveyed with increased bearing pressure of the conveyor rollers, which can serve to improve contact, it can be provided that the metal strip bent to form a flute, acted on with filler, is deformed in an overlapping manner to form a tube and this is further processed.

In order to achieve desired high fullnesses of the filler wire with powder core material, according to the invention in a favorable manner the metal strip bent to form a flute, acted on with filler, can be deformed to form a tube with a joint in the longitudinal direction and this can be further processed.

According to a particularly preferred embodiment of the invention, it can be provided that after the bending of the flute acted on with filler to form a tube, this tube is coated outside with a mixture of polymers, preferably organic polymers, in particular polytetrafluoroethylene (PTFE), and graphite and subsequently further shaped to a smaller diameter of less than 2 mm.

Advantageously, in this manner on the one hand favorable conditions are created in the further shaping of the tube to form filler wire with small diameter through a lubricating effect of the coating, on the other hand, a desired current transfer to the filler wire can be promoted through a graphite content.

A targeted application of the layer that is simple in terms of the manufacturing sequence can take place if the outer coating of the tube takes place by means of passing the same through a mixture of polymer(s) and graphite.

If according to one embodiment of the invention the filler wire before a winding on a coil form is surface-treated by partially stripping the layer, a desired layer thickness for a welding or soldering can be produced with great precision over the entire production length of the wire.

Finally, the object of the invention is attained through a use of filler material, formed as filler wire, optionally with a surface layer formed of polymer(s) and graphite, built up of a sheath of aluminum and/or magnesium and/or zinc deformable alloy of these metals with a thermal conductivity of more than 110 W/mK and a core of compacted powder, whereby the core material comprises a metal powder and/or a powder of at least one metal compound and/or a non-metallic compound and/or an agent giving off gas at increased temperature and/or at least one component forming slag, for a thermal production of a joint or a material layer metallically connected to the base material of or on objects of light metal and/or zinc alloys with a thermal conductivity of more than 110 W/mK.

Excellent quality results were completely surprising to one skilled in the art with a use of filler material formed as filler wire, optionally with a surface layer formed of polymer(s) and graphite, built up of a sheath of aluminum and/or magnesium and/or of zinc deformable alloy of these metals with a thermal conductivity of more than 110 W/mK and a core of compacted powder of at least one metal compound and/or a non-metallic compound and/or an agent giving off gas at increased temperature and/or of at least one component forming slag, for a thermal production of a joint of parts of ceramic materials or of parts of ceramic materials with metallic objects, in particular steel.

In this manner objects of individual parts with completely different properties can be produced economically and simply with metallic connection of the same.

The invention is described in more detail below based on several results. An alloy AlMg5 was used as base material. The weldings occurred without pulsed-current technology. If it is used, further improvements can be achieved, in particular with the filler material according to the invention.

BRIEF DESCRIPTION OF THE DRAWINGS

They show.

DETAILED DESCRIPTION

Figure 1:
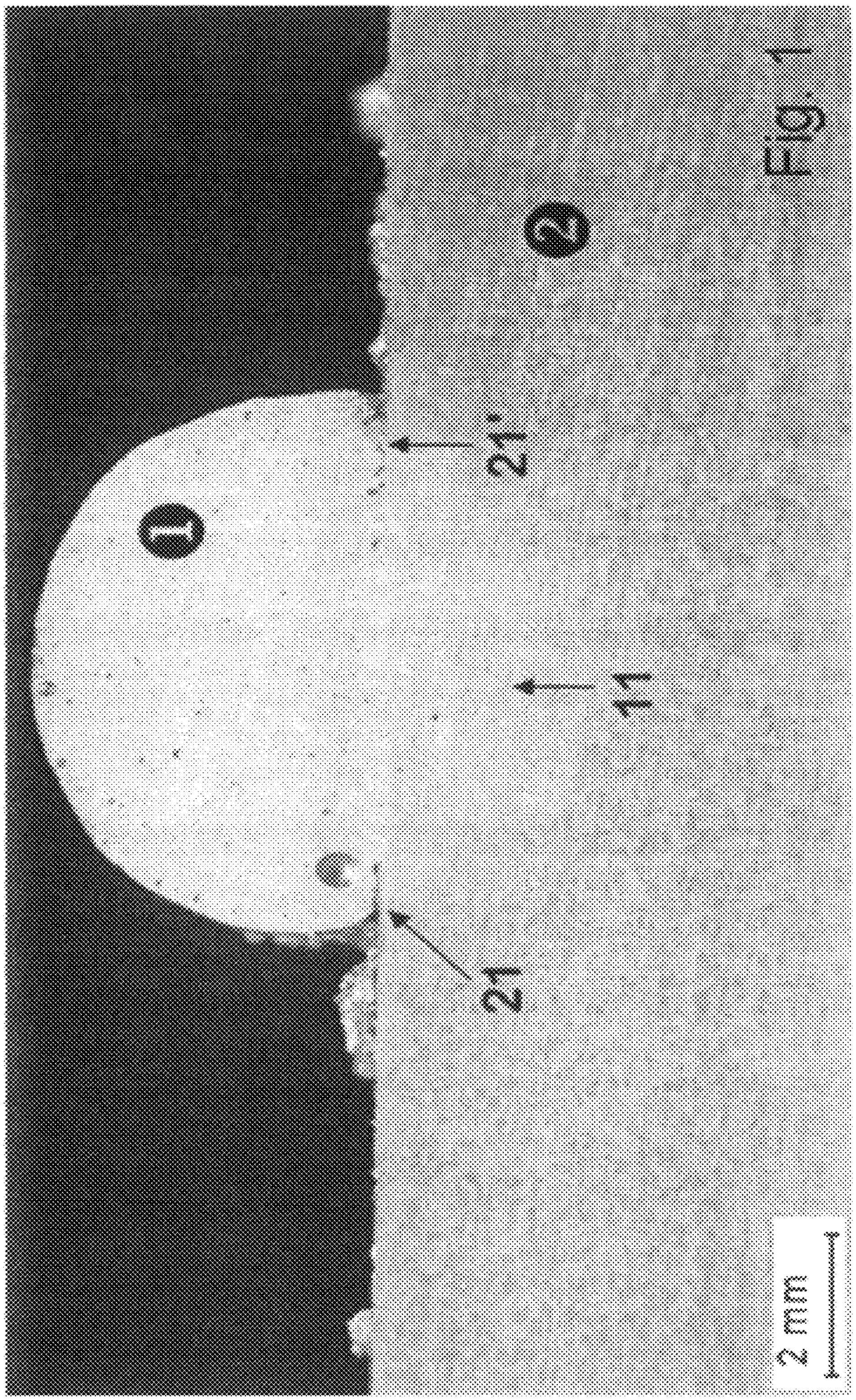
FIG. 1 through FIG. 3 Weld material on a base material, produced with electrodes according to the prior art FIG. 4 through FIG. 6 Weld material on a base material, produced with filler wire electrodes according to the invention FIG. 7 Weld material with pores on a base material FIG. 8 Weld material produced with a filler wire electrode according to the invention FIG. 9 Parts welded by means of filler wire electrodes according to the invention FIG. 10 Filler wire with an overlapping sheath FIG. 11 Filler wire with a joint in the sheath

FIG. 1 shows a weld material layer 1, produced with a currently commercial electrode on a base material 2. A deposit welding took place with low electric current strength, whereby with low weld depth 11 in the base material 2 clear bonding flaws 21, 21' are given between this and the weld material layer 1.

Figure 2:
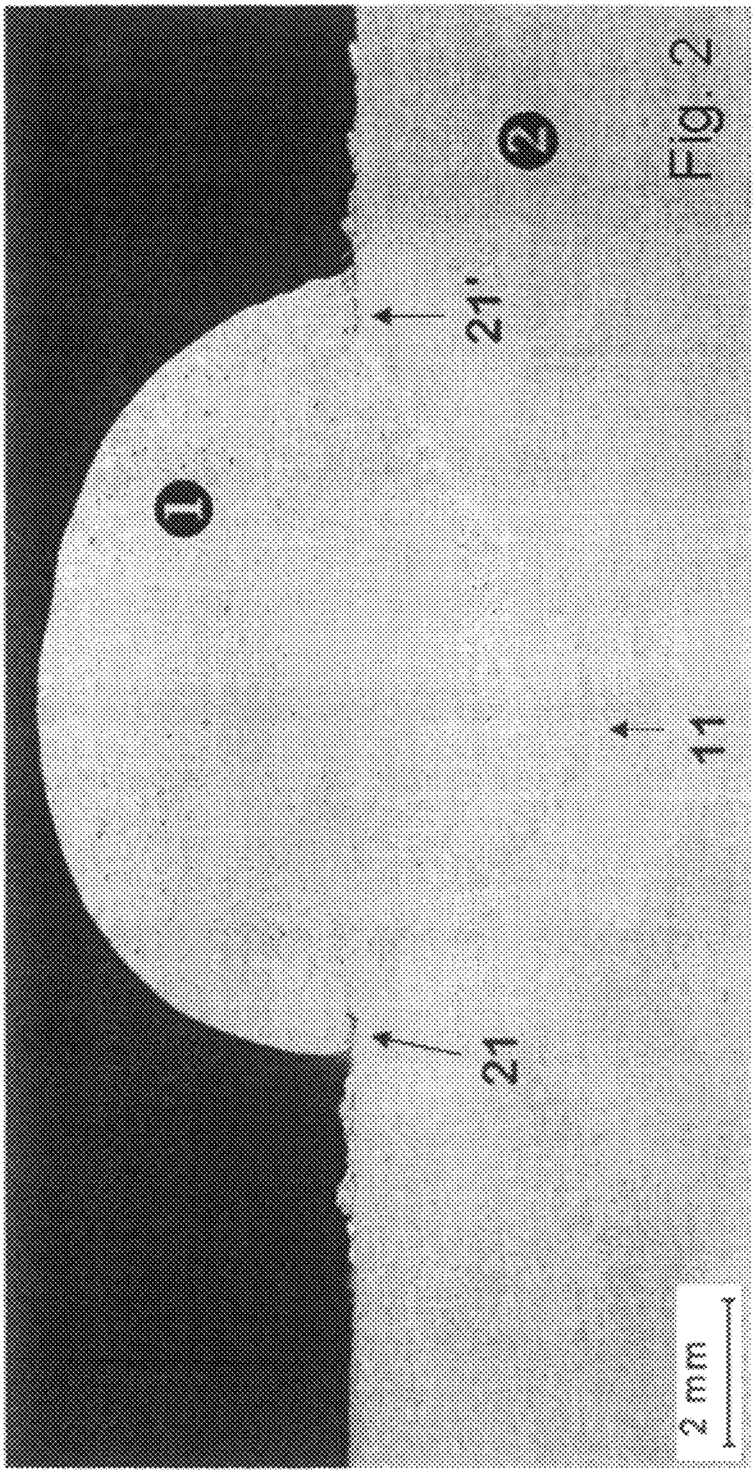

FIG. 2 shows a weld material layer 1 produced with an increased current strength but otherwise in the same manner. With a clearly increased weld depth or fusion depth 11 of the weld layer 1 in the base material 2 through an increased energy supply, bonding flaws 21, 21' are still given at the edges of the weld material.

Figure 3:
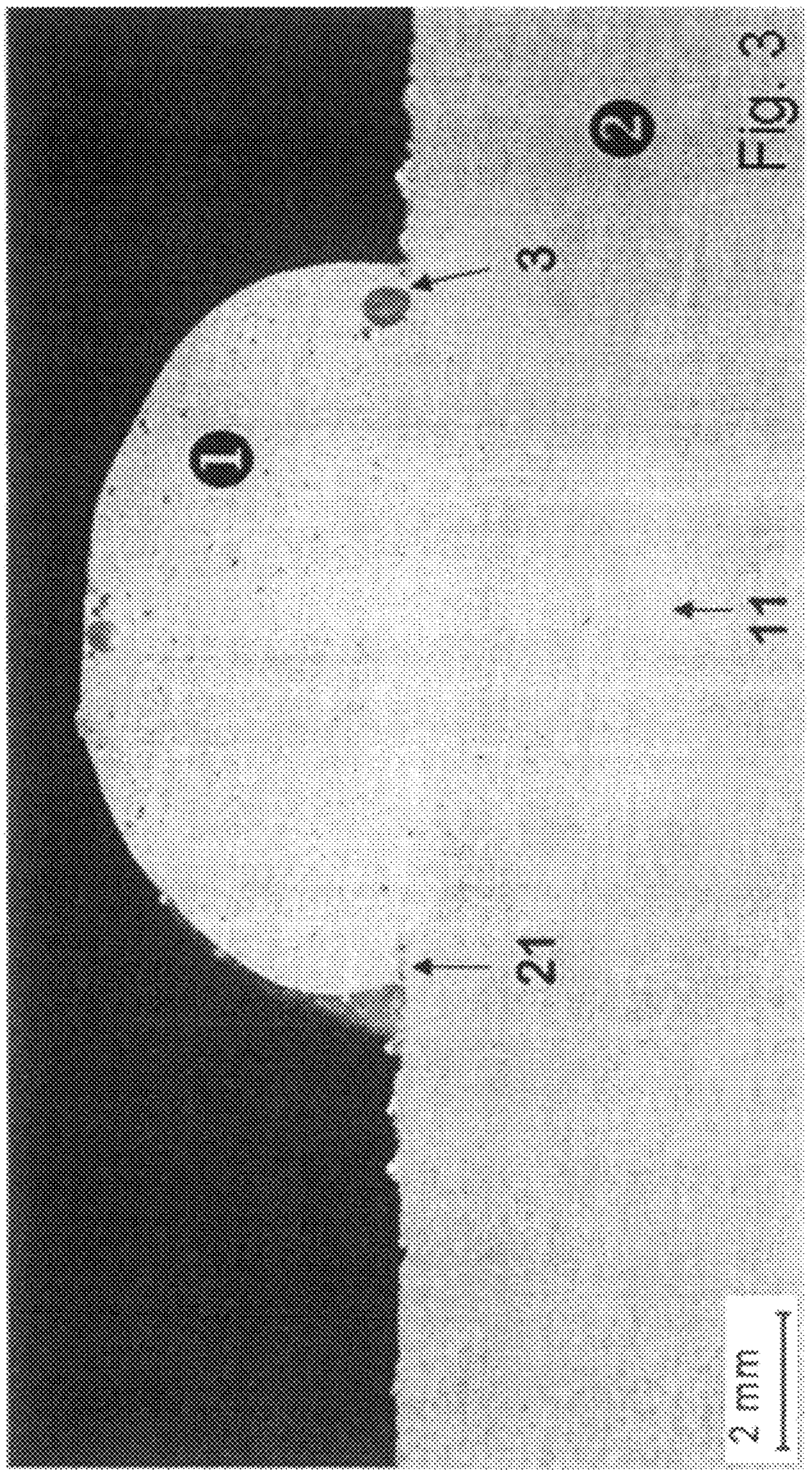

Even with another increase of the weld energy, as shown in FIG. 3, bonding flaws 21, 21' occur between weld material 1 and base material. Through an increased heat input the fusion depth is embodied in an enlarged manner and the number and size of the pores 3 are increased. According to expert opinion, this is attributable to a gassing of the liquid metal during the solidification of the weld layer 1.

Figure 4:
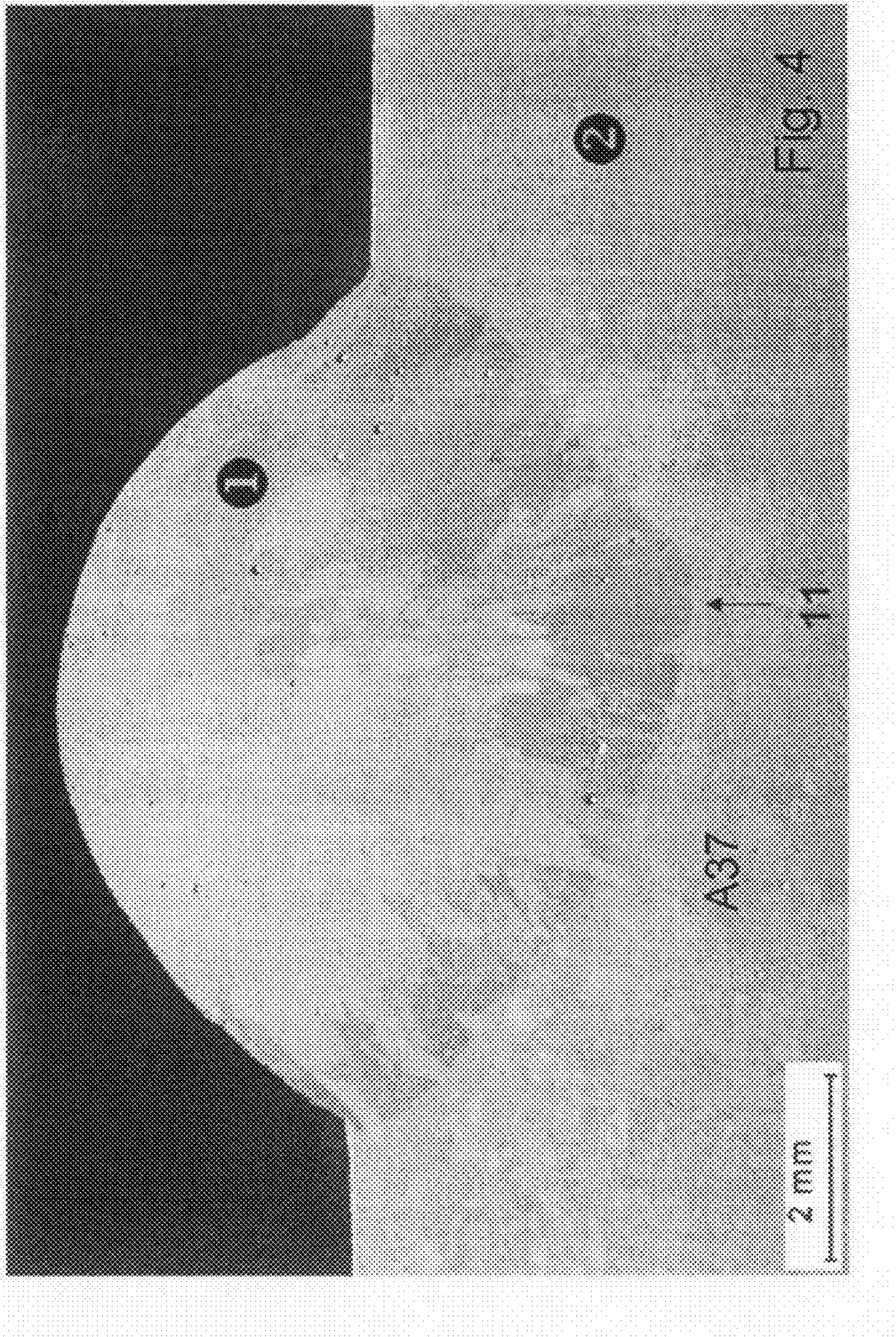

FIG. 4 shows a weld layer 1, produced with filler wire according to the invention. Despite low electric energy supply, there are no bonding flaws in the outer bond area.

Figure 5:
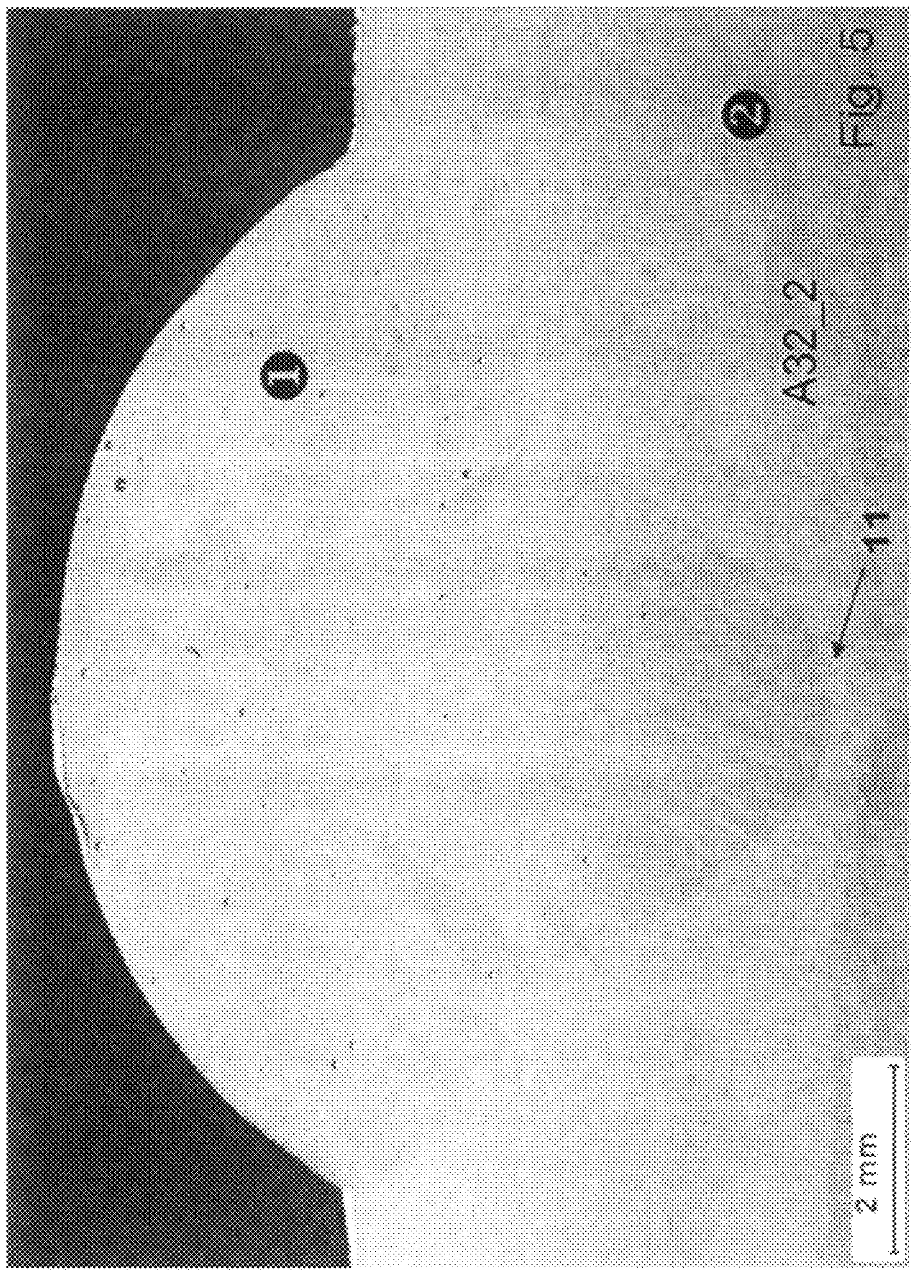

With an increased proportion of sheath of the filler wire with increased metal powder filling in the core material and higher energy supply, as FIG. 5 shows, an enlarged fusion depth 11 of the weld layer 1 is achieved with flaw-free bonding between this and the base material 2.

Figure 6:
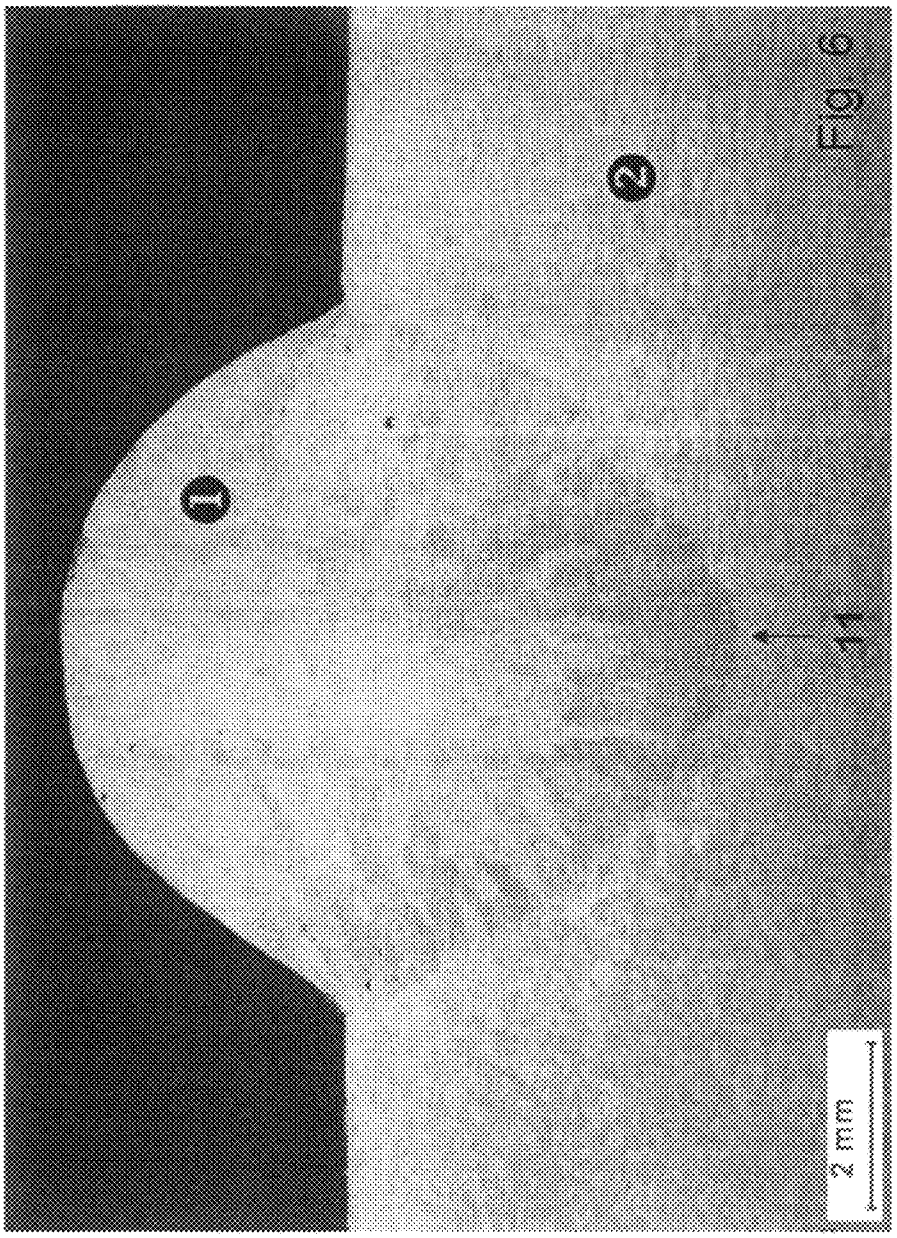

FIG. 6 shows a very high fusion depth 11 free from bonding flaws of the weld layer 1 in the base material 2.

As illustrated by FIG. 4 through FIG. 6, with a filler wire according to the invention by selecting the geometric parameters of the same and the core material composition, a desired fusion depth 11 in the base material 2 with a predetermined volume of weld material 1 with corresponding electric power supply flaw-free material connections depending on requirements can be produced.

Figure 7:
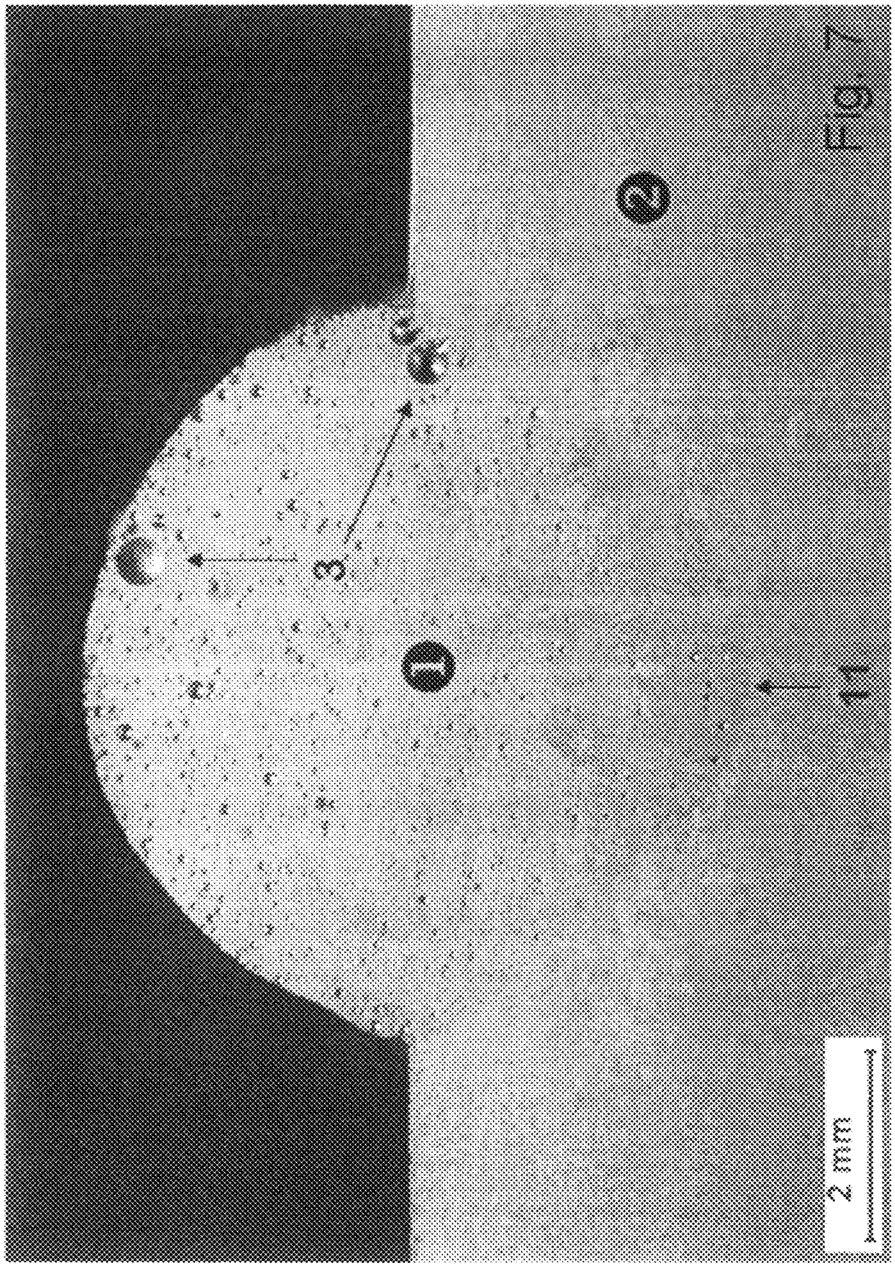

FIG. 7 shows a weld layer 1 with pores 3. The pores were formed in the liquid weld filler material during the solidification thereof due to the drop in solubility for gases.

Figure 8:
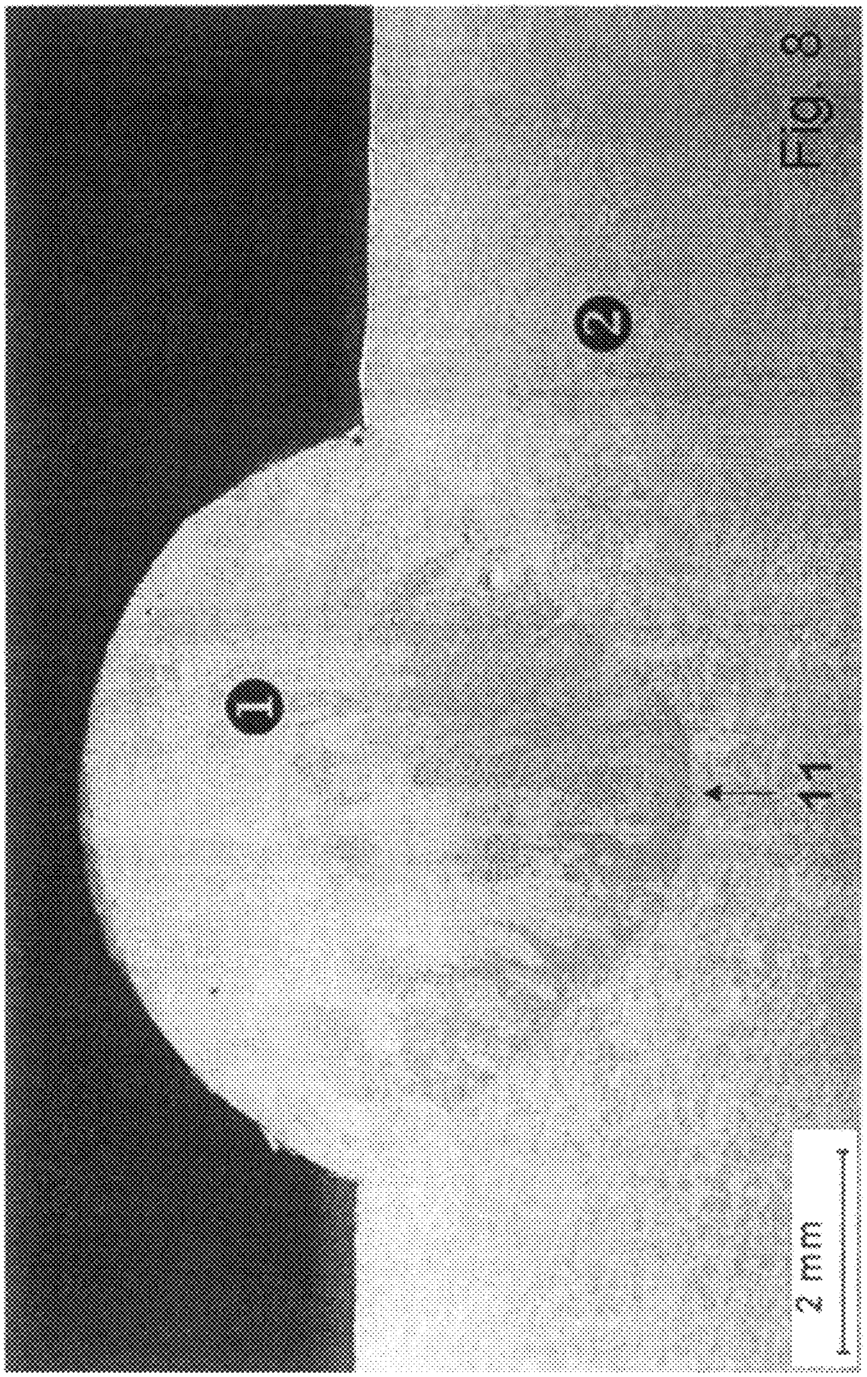

As can be seen from FIG. 8, with a core material according to the invention containing PTFE, or with an application of the same on the outside, a filler wire can be created which causes a substantial reduction of the proportion of pores 3 in the weld material.

Figure 9:
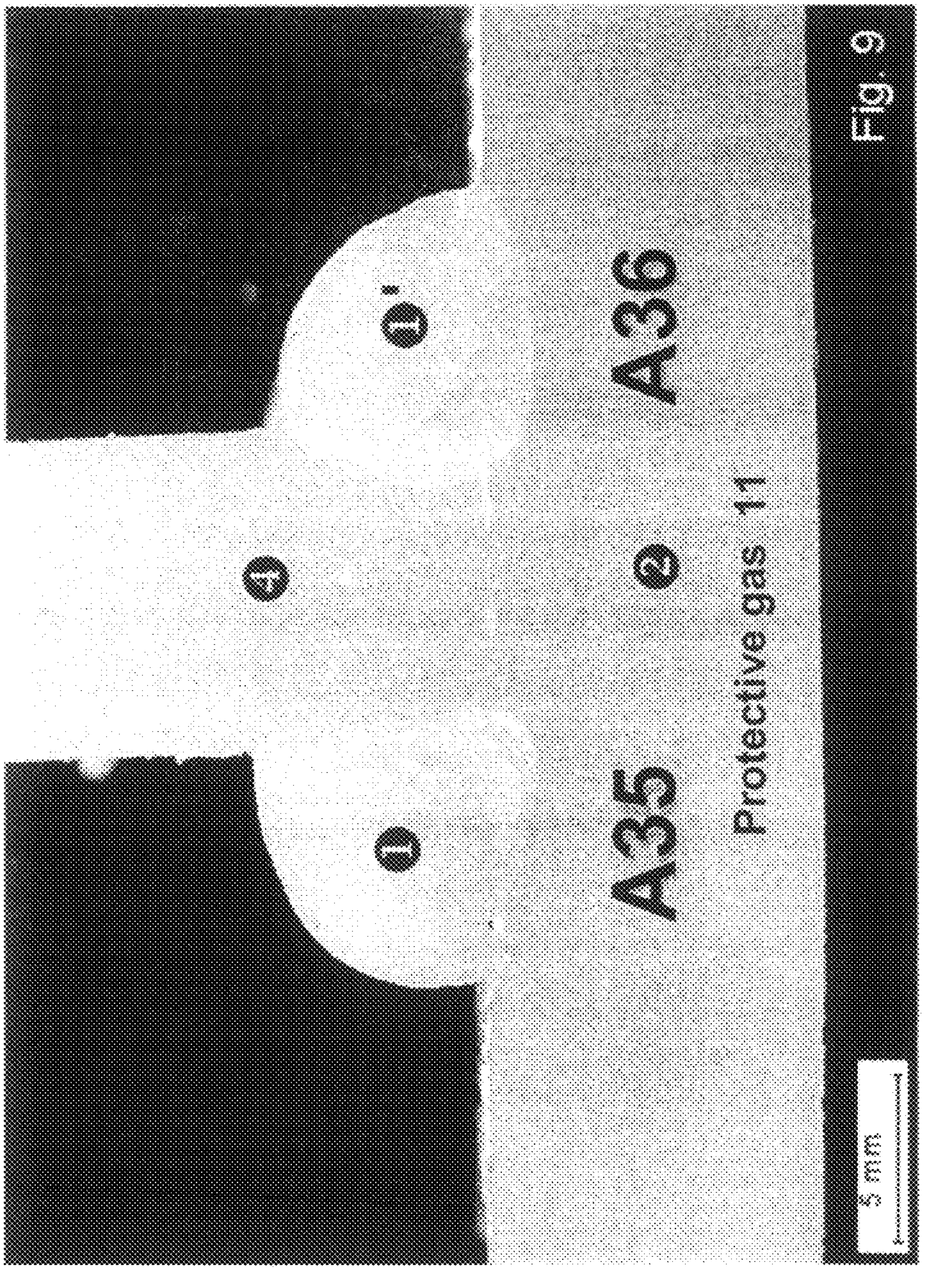

FIG. 9 shows welded parts 2, 4, the connection of which were produced in the course of the development work. A production of the two weld layers 1, 1' (A35, A36) took place with filler wire electrodes according to the invention, but with different geometric and process engineering parameters. The image clearly shows a connection by fusion welding free from flaws on both sides.

Figure 10:
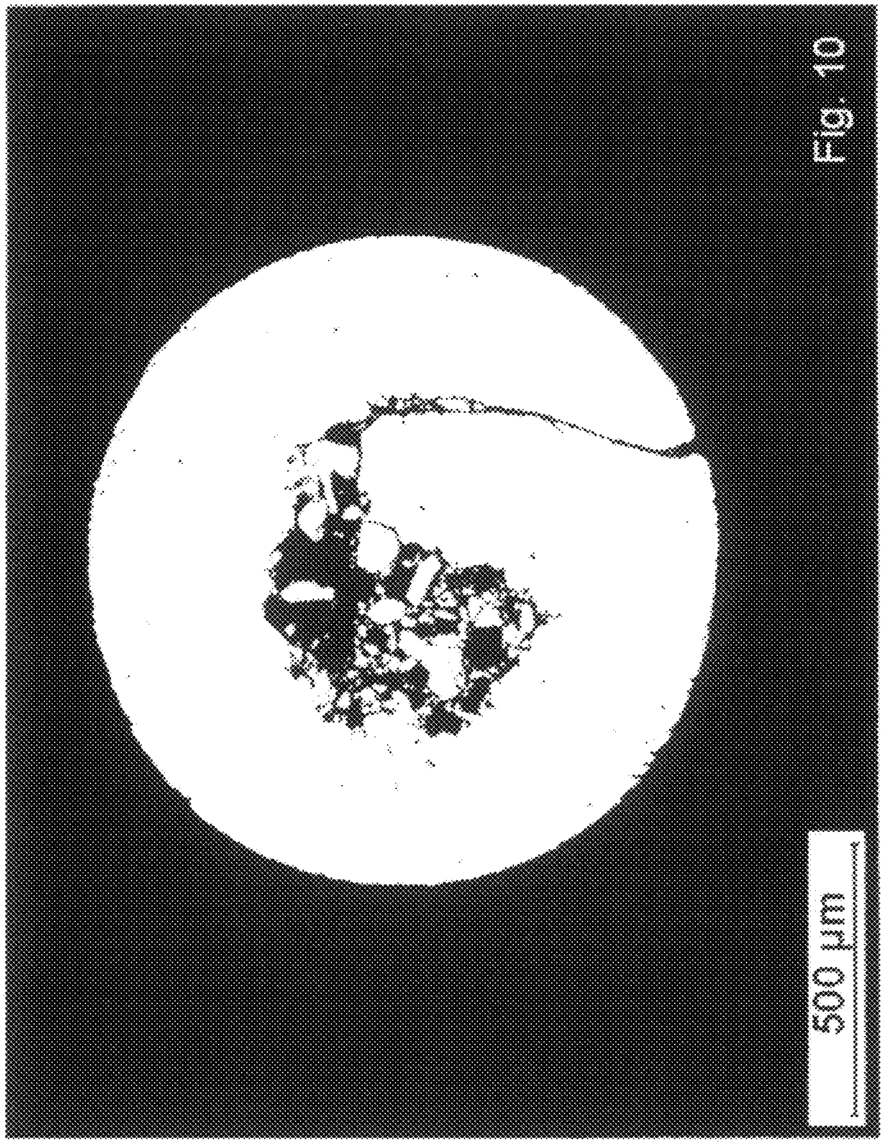

FIG. 10 shows the cross section of a filler wire with an overlapping sheath.

Figure 11:

FIG. 11 illustrates a filler wire with a joint essentially on the front face of the sheath.

The invention claimed is:

1. Filler material for thermal production of a joint or of a metal layer metallically connected to base material of or on an object of at least one of light metal, light metal alloy and zinc alloy wherein each of the light metal, light metal alloy and zinc alloy has a thermal conductivity of more than 110 W/mK, the filler wire comprising: a filler wire including a sheath with a conductivity of 0.027 to 0.2 μΩxm comprising at least one metal of aluminum, magnesium, and zinc, or a deformable alloy of one or more of these metals wherein the alloy has a thermal conductivity of more than 110 W/mK; a core of compacted powder including core material comprising at least one of a metal powder, a powder of at least one metal compound, a non-metallic compound, an agent giving off gas at increased temperature, and at least one component forming slag; and an outer surface of the filler wire including a layer formed of at least one organic polymer and graphite, and volume fraction of the graphite in the layer is 15% to 45%.

2. The filler material according to claim 1, wherein the sheath has a volume proportion ranging from 40% to 95% of filler wire volume.

3. The filler material according to claim 1, wherein the sheath has a cross-sectional area proportion ranging from 40% to 95% of the filler wire volume.

4. The filler material according to claim 1, wherein the core material comprises in parts by weight of 5% to 52% of the total weight of the filler wire.

5. The filler material according to claim 1, wherein the core material further comprises at least one organic polymer.

6. The filler material according to claim 1, wherein the core material further comprises at least one alkali metal compound.

7. The filler material according to claim 1, wherein the filler wire has a core material with a proportion of 8% by weight to 24% by weight made from metal powder and at least one fluoride.

8. The filler material according to claim 1, wherein the filler wire comprises a welding filler for production of a fusion-welded connection.

9. The filler material according to claim 1, wherein the filler wire comprises a solder filler or a solder to produce a soldered connection.

10. The filler material according to claim 9, wherein the sheath material of the filler wire has a lower solidus temperature than the at least one base material.

11. Method for producing a filler material for a connection or an application of or on an object of at least one of light metal, light metal alloy and zinc alloy wherein each of the light metal, light metal alloy and zinc alloy has a thermal conductivity of more than 110 W/mK, the method comprising: bending a metal strip of at least one of aluminum, magnesium, and zinc or a ductile alloy of one or more of these metals in longitudinal direction into a metal flute; providing the flute with filler, forming the flute provided with the filler into a tube containing the filler, the tube having a conductivity of 0.027 to 0.2 μΩxm and a diameter of more than 0.5 mm, but less than 3.5 mm so as to form a filler wire including an outside surface; coating the outside surface of the filler wire with a layer including at least one organic polymer and graphite with volume fraction of the graphite in the layer being 15% to 45%; winding the filler wire as at least one wound coil on a coil form; and at least one of storing the at least one wound coil to protect against moisture and preparing the at least one would coil in situ.

12. The method according to claim 11, wherein the tube has a diameter of less than 2.0 mm.

13. The method according to claim 11, wherein at least one of the filler and components of the filler is at least one of at least partially pretreated and mixed homogenously as a powder before insertion in the metal flute.

14. The method according to claim 11, wherein at least one organic polymer is added to the filler as a component.

15. The method according to claim 11, wherein at least one of sodium, potassium, magnesium, and calcium compounds is added to the filler as at least one component to form slag.

16. The method according to claim 11, wherein at least one of powder of metal, metal compound and non-metallic compound is added to the filler as at least one component.

17. The method according to claim 11, wherein the filler wire is produced under conditions with at least one of reduced oxygen content and reduced moisture content compared to the atmosphere.

18. The method according to claim 11, wherein the filler wire is wound on a coil form with a mass of 2 to 10 kg and at least one coil is packed in foil or in containers in an airtight manner.

19. The method according to claim 11, wherein forming the flute into a tube comprises deforming the flute in an overlapping manner to form the tube.

20. The method according to claim 11, wherein forming the flute into a tube comprises forming a tube with a joint in longitudinal direction.

21. The method according to claim 11, further including subsequently further shaping the filler wire to a smaller diameter of less than 2 mm.

22. The method according to claim 21, wherein the coating of the outside surface of the filler wire takes place by passing the tube through a mixture of the at least one organic polymer and the graphite.

23. The method according to claim 21, comprising surface-treating the filler wire before winding on a coil form by partially stripping the outer coating.

24. Method for thermal production of a joint or a material layer metallically connected to a base material of or on an object of at least one of light metal, light metal alloy and zinc alloy with a thermal conductivity of more than 110 W/mK, the method comprising: thermally joining or producing the material layer with a filler material, the filler material comprising a filler wire including a sheath with a conductivity of 0.027 to 0.2 μΩxm comprising at least one metal of aluminum, magnesium, and zinc, or a deformable alloy of one or more of these metals with a thermal conductivity of more than 110 W/mK, and a core of compacted powder including core material comprising at least one of a metal powder, a powder of at least one metal compound, a non-metallic compound, an agent giving off gas at increased temperature, and at least one component forming slag; and forming an outer surface of the filler wire including a layer formed of at least one organic polymer and graphite, the volume fraction of the graphite in the layer ranging from 15% to 45%.

25. Method for thermal production of a joint of a part of a ceramic material or of a part of a ceramic material with a metallic object, the method comprising: thermally producing the joint with a filler material comprising a filler wire, including a sheath with a conductivity of 0.027 to 0.2 μΩxm comprising at least one of aluminum, magnesium, and zinc, or a deformable alloy of one or more of these metals with a thermal conductivity of more than 110 W/mK, and a core of compacted powder including core material comprising at least one of a metal powder, a powder of at least one metal compound, a non-metallic compound, an agent giving off gas at increased temperature, and at least one component forming slag: and forming an outer surface of the filler wire including a layer formed of at least one organic polymer and graphite, the volume fraction of the graphite in the layer ranging from 15% to 45%.

26. The filler material according to claim 5, wherein each at least one organic polymer comprises polytetrafluoroethylene.

27. The filler material according to claim 6, wherein the at least one alkali metal compound comprises at least one of sodium and potassium compounds.

28. The filler material according claim 6, wherein the at least one alkali metal compound comprises at least one of alkali metal fluoride and alkali metal chloride.

29. The filler material according to claim 7, wherein the least one organic polymer in the layer comprises polytetrafluoroethylene.

30. The method according to claim 18, wherein the airtight manner includes a vacuum.

31. The method according to claim 21, wherein the at least one organic polymer in the layer comprises polytetrafluoroethylene.

32. The method according to claim 25, wherein the joint of a part of a ceramic material or of a part of a ceramic material with a metallic object comprises a part of a ceramic material with a metallic object and the metallic object comprises a steel object.

33. The filler material according to claim 1, wherein the least one organic polymer in the layer comprises polytetrafluoroethylene.

34. The method according to claim 24, wherein the least one organic polymer in the layer comprises polytetrafluoroethylene.

35. The method according to claim 25, wherein the least one organic polymer in the layer comprises polytetrafluoroethylene.

36. The method according to claim 24, wherein the core further includes at least one organic polymer.

37. The method according to claim 25, wherein the core further includes at least one organic polymer.

38. The method according claim 14, wherein each at least one organic polymer comprises polytetrafluoroethylene.

39. The method according claim 36, wherein each at least one organic polymer comprises polytetrafluoroethylene.

40. The method according claim 37, wherein each at least one organic polymer comprises polytetrafluoroethylene.

41. The filler material according to claim 1, wherein the core material includes graphite.

42. The method according to claim 11, wherein the filler includes graphite.

43. The filler material according to claim 24, wherein the core material includes graphite.

44. The filler material according to claim 25, wherein the core material includes graphite.

* * * * *